F. A. WILL & J. FINCK.
Skewer-Puller.
No. 196,612  Patented Oct. 30, 1877.
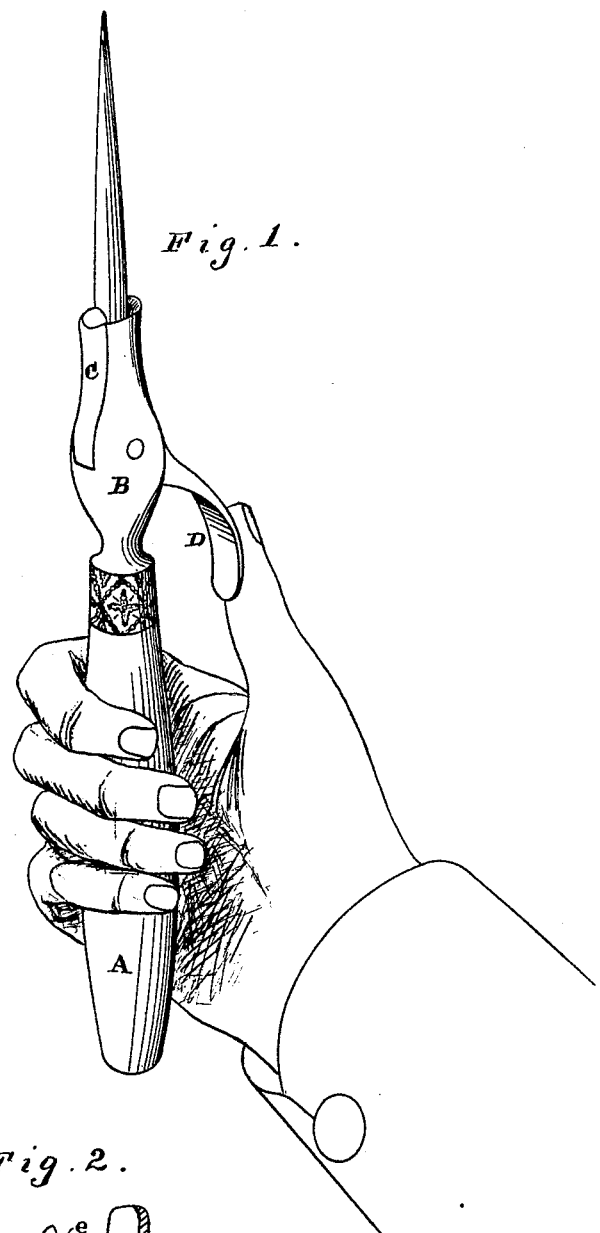
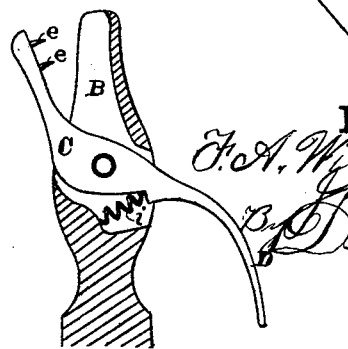
Witnesses
Geo. H. Strong.
Jno. L. Boone.
Inventors.
F. A. Will and
Julius Finck
By Dewey & Co.
attys.

UNITED STATES PATENT OFFICE.

FREDERICK A. WILL AND JULIUS FINCK, OF SAN FRANCISCO, CALIFORNIA.

IMPROVEMENT IN SKEWER-PULLERS.

Specification forming part of Letters Patent No. 196,612, dated October 30, 1877; application filed August 30, 1877.

*To all whom it may concern:*

Be it known that we, FREDERICK A. WILL and JULIUS FINCK, of the city and county of San Francisco, and State of California, have invented an Improved Skewer-Puller; and we do hereby declare the following to be a full, clear, and exact description thereof, reference being had to the accompanying drawings.

Our invention relates to an implement for pulling skewers and replacing them again in a roast.

In order to properly carve a roast that has been fastened together with skewers, the skewers which directly interfere with the carving must be withdrawn; and in order to prevent the roast from falling to pieces, the skewers must be again inserted into the roast at some other place before the fork is withdrawn.

Our skewer-pulling implement is intended for this purpose, as it gripes the skewer in such a manner that it can be readily pulled, and at the same time holds it so that it can be stabbed into the roast again, as hereinafter more fully described.

Referring to the accompanying drawings, Figure 1 is a view of my device. Fig. 2 is a section of the same.

A represents a handle similar to an ordinary carver-handle. B is a shank, which projects from one end of the handle, and serves as the permanent jaw of a griper. A portion of the end of this shank is made concave on one side, the concavity being large enough to admit the projecting end of the skewer to be pulled. C is a movable jaw, which is attached by a rivet to the permanent jaw, and has a short lever-handle, D, which projects from the shank and curves backward in the proper position to be pressed down by the thumb of the person holding the handle. The jaw C closes into the concavity of the fixed jaw, and has short teeth $e$ $e$ formed on it.

To remove a skewer, the end which projects from the roast is grasped between the two jaws, so that it is caught in the concavity of the fixed jaws. The teeth are then pressed into it, when it can easily be drawn.

After the desired quantity of meat has been cut from the roast, or whenever it is desired to replace a skewer either in the place from which it was withdrawn or in another place, it is seized by the jaws and pressed into the meat again, the concavity of the permanent jaw retaining it in the proper position.

We usually apply a spring, $i$, at the base of the thumb-lever, to throw the movable jaw open when no pressure is exerted upon the lever; but this is not absolutely necessary, but is more convenient.

Although the teeth $e$ $e$ are serviceable in holding the skewer, they might be omitted and plain jaws used.

We thus add a new and important implement to a set of carvers, and provide the means for keeping a roast in a sightly condition until it is entirely cut up.

Having thus described our invention, what we claim, and desire to secure by Letters Patent, is—

1. A skewer-puller consisting of the handle A, permanent jaw B, with its concave extremity, and the movable jaw C, arranged to be operated by pressing upon the thumb-lever D, substantially as and for the purpose described.

2. A skewer-puller consisting of a concave permanent jaw, B, and movable jaw C, provided with teeth $e$ $e$, and provided with an ordinary cutlery-handle, substantially as above specified.

In witness whereof we have hereunto set our hands and seals.

FREDERICK A. WILL. [L. S.]
  JULIUS FINCK. [L. S.]

Witnesses:
 FRANK A. BROOKS,
 WM. H. THOMPSON.